(12) United States Patent
Mitchell (10) Patent No.: US 7,832,975 B1
(45) Date of Patent: Nov. 16, 2010

(54) SPRING-BIASED FOLDING TRUCK RAMP (75) Inventor: Donald J. Mitchell, Wellsburg, WV (US)

(73) Assignee: Eagle Manufacturing Company, Wellsburg, WV (US)

( * ) Notice: Subject to any disclaimer, the term of this patent is extended or adjusted under 35 U.S.C. 154(b) by 791 days.

(21) Appl. No.: 11/788,961

(22) Filed: Apr. 23, 2007

(51) Int. Cl.
*B62D 33/03* (2006.01)
*E01D 1/00* (2006.01)

(52) U.S. Cl. .................................. 414/537; 296/61
(58) Field of Classification Search ............ 414/537, 414/538; 296/51, 61
See application file for complete search history.

(56) References Cited

U.S. PATENT DOCUMENTS

| | | | | |
|---|---|---|---|---|
| 3,352,440 | A | | 11/1967 | Wilson .................. 214/85 |
| 3,516,560 | A | | 6/1970 | Brighton ................ 214/85 |
| 3,580,404 | A | | 5/1971 | Moser | |
| 3,834,565 | A | | 9/1974 | Goodman, Jr. et al. ....... 214/85 |
| 4,084,713 | A | | 4/1978 | Rohrs et al. ............. 214/85 |
| 4,088,235 | A | | 5/1978 | Thacker ................. 214/85 |
| 4,979,867 | A | | 12/1990 | Best ................... 414/537 |
| 5,096,362 | A | | 3/1992 | Best ................... 414/537 |
| 5,145,310 | A | * | 9/1992 | Calzone ................ 414/537 |
| 5,287,579 | A | * | 2/1994 | Estevez, Jr ............. 14/71.1 |
| 5,540,474 | A | | 7/1996 | Holland ................ 296/61 |
| 5,769,593 | A | * | 6/1998 | Buffaloe ................ 414/537 |
| 5,907,276 | A | | 5/1999 | Lance ................. 340/425.5 |
| 5,988,725 | A | * | 11/1999 | Cole ................... 296/61 |
| 5,993,135 | A | | 11/1999 | Wolgamood ............ 414/537 |
| 6,386,819 | B1 | | 5/2002 | Schultz ............... 414/537 |
| 6,447,040 | B1 | * | 9/2002 | Young, Sr. .............. 296/61 |
| 6,536,064 | B1 | | 3/2003 | Swink et al. ............ 14/69.5 |
| 6,722,721 | B2 | * | 4/2004 | Sherrer et al. ........... 296/61 |
| 6,764,123 | B1 | * | 7/2004 | Bilyard ................ 296/61 |
| 6,913,305 | B1 | * | 7/2005 | Kern et al. .............. 296/51 |
| 6,976,723 | B2 | | 12/2005 | Libby ................. 296/50 |
| 7,062,813 | B2 | | 6/2006 | Hoofard et al. .......... 14/69.5 |
| 7,082,637 | B1 | * | 8/2006 | Griffin ................ 14/69.5 |
| 7,186,069 | B2 | * | 3/2007 | Ehler ................. 414/538 |
| 2005/0061227 | A1 | * | 3/2005 | Ostreng et al. .......... 114/362 |

* cited by examiner

*Primary Examiner*—Charles A Fox
(74) *Attorney, Agent, or Firm*—Kratz, Quintos & Hanson, LLP (57) ABSTRACT

A ramp system for a delivery vehicle for bridging a cargo bed of the vehicle and a ground surface. A series of ramps of the system are easily moved between a use orientation and a stowed orientation with the assistance of torsion springs of the system. The ramps are moveable for placement at various locations across the width of the vehicle and the selected location for use is locked so as to prevent widthwise movement of the ramps during use. No cargo area is used for stowing the ramps when not in use.

11 Claims, 6 Drawing Sheets

FIG. 6

SPRING-BIASED FOLDING TRUCK RAMP

FIELD OF THE INVENTION

The present invention relates to a folding ramp for use on a delivery vehicle to facilitate loading and unloading of cargo.

BACKGROUND OF THE INVENTION

Delivery of many types of products is carried out in trucks known as Step Vans. A Step Van or a similar delivery vehicle is configured, with wheel wells and the like, so as to have a cargo area with a cargo bed which is as close to the ground as possible, to facilitate loading and unloading of cargo being transported in the vehicle. A roll-up overhead door is usually found on this type vehicle as it can be quickly opened and closed by the delivery person and clearance either inside the cargo area or in the vicinity of the vehicle is not required, as would be for hinged doors. Typically a vehicle of this type has a step outside the cargo area, at the rear of the vehicle and below the cargo bed, to make it easier for the delivery person to enter and exit the cargo area. Many vehicles of this type are used to service retail establishments or make home deliveries requiring a large number of delivery points and it is important for the delivery person to be able to work in a highly efficient and safe manner. If a single package is to be obtained from the cargo area, for example, a delivery person can easily access the cargo area, with use of the step, in an efficient manner. However, if a large number of cartons, for example, are to be unloaded the efficiency of the delivery person can be increased with use of a ramp to bridge the distance between the cargo bed and ground surface. A ramp makes for safer and more efficient loading and unloading not only when the delivery person is carrying a carton, or the like, but also when the cargo is being loaded or unloaded with use of a wheeled device such as a cart or a dolly.

In order to be of benefit in increasing efficiency, the ramp must be easily and quickly set up to be in an orientation for use and must be easily and quickly stowed in a secure manner to permit safe operation of the vehicle in congested city streets as well as at highway speeds. Although stowing the ramp inside the cargo area might accomplish such a goal, a loss of cargo area due to space taken up by the ramp decreases the capacity and efficiency of the delivery vehicle.

Another factor to be considered, especially in view of the need to operate in weather of all types, is the safety of the delivery person and the care of the product being transported. Consideration must be given to the travel surface of the ramp to help prevent slippage by the delivery person, especially when a heavy load is being moved up or down the ramp with use of a cart or the like. Additionally, consideration should be given to preventing wheels of a cart or dolly from accidentally leaving a side of the travel surface.

OBJECTS OF THE INVENTION

It is an object of the present invention to provide a ramp system for use on a delivery van type vehicle which can be used safely and efficiently by the operator of the vehicle. In particular, it is an object of the invention to provide a ramp for bridging between a cargo bed of the vehicle and the ground surface, which can be quickly arranged from a stowed orientation to a use orientation and back to the stowed orientation.

It is another object of the invention to provide a ramp system having a travel surface which affords adequate footing and guides to prevent slippage off a side of the ramp.

It is still another object of the invention to provide a ramp system which does not take away from the cargo area, when stowed, yet still provides stowage in a safe manner which complies with vehicle safety regulations.

It is still another object of the invention to provide a ramp system in which the location of the ramp, when oriented for use, can be varied in relation to a widthwise direction of the vehicle, and, in which the location of the ramp when stowed and when use of the ramp is not desired, does not significantly block access to the cargo area or create a safety hazard because of attachment means or the like which might be encountered by the delivery person.

It is yet another object of the invention to provide a ramp which is lightweight in construction and which is provided with means to reduce the effort required for arranging the ramp from a stowed orientation to a use orientation, and vice versa.

SUMMARY OF THE INVENTION

The present invention is a ramp system adapted to be attached to a vehicle to bridge a cargo bed of the vehicle and a surface lower than the cargo bed, the ramp system has a center section, a vehicle-end section hinged to the center section to bridge the center section and the cargo bed, and a lower-end section hinged to the center section at a surface-supported end thereof to bridge the center section and the surface. An attachment means is adapted to be attached to the vehicle for supporting the center section and permitting varied placement of the ramp along a widthwise direction of the vehicle during use and permitting rotation of the center section from a use orientation to a substantially vertical orientation for stowing. The attachment means includes at least one torsion spring acting to counter weight of the ramp during the rotation, and a rotation limiting means for preventing rotation of the ramp beyond the substantially vertical orientation in a direction toward the cargo bed.

BRIEF DESCRIPTION OF THE DRAWINGS

The invention will become more readily apparent from the following description of a preferred embodiment thereof shown, by way of example only, in the accompanying drawings, wherein.

DETAILED DESCRIPTION OF THE INVENTION

Figure 1:
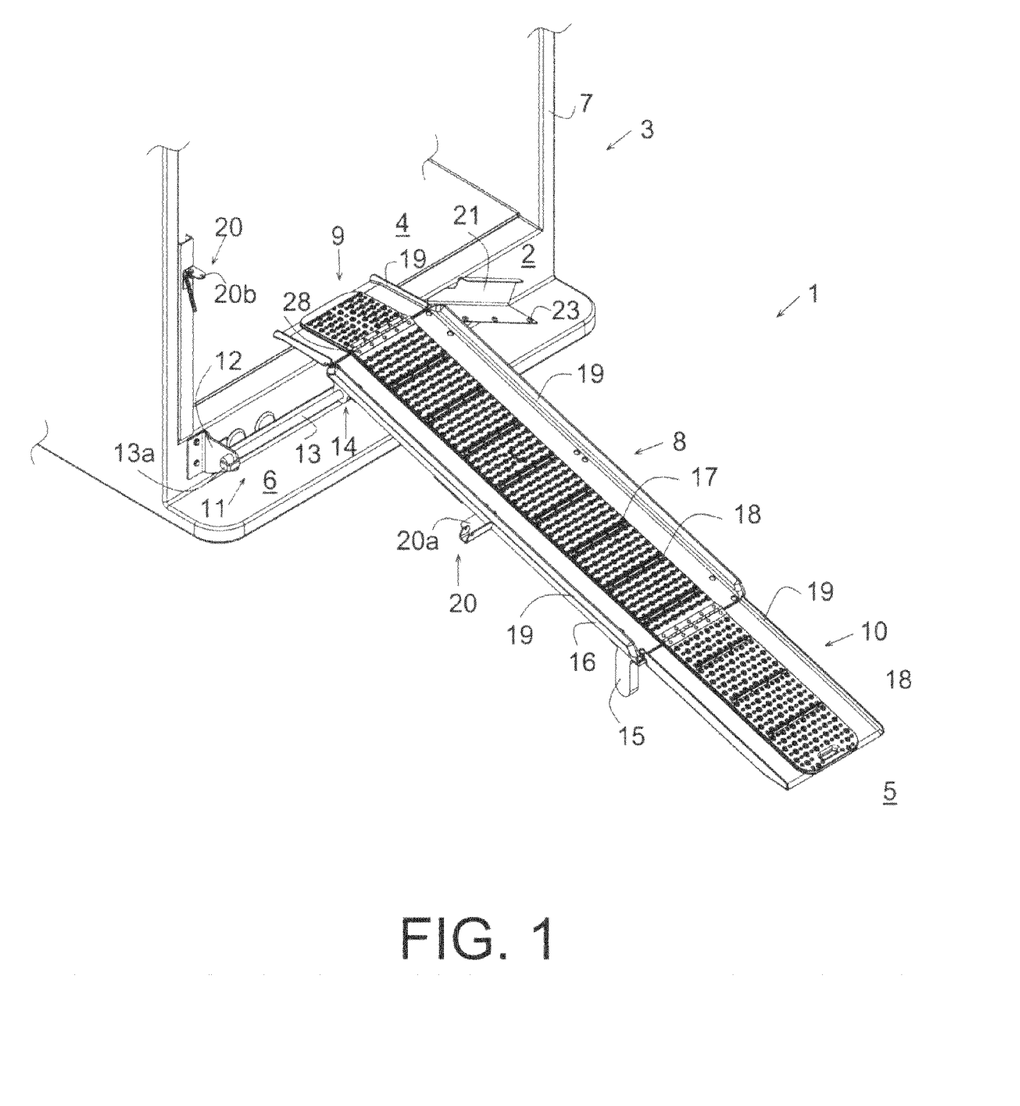
FIG. 1 is a perspective view of the ramp system of the invention attached to a delivery vehicle and having the ramp arranged to be in a use orientation.

The ramp system of the invention is shown in FIG. 1, and additional drawings, attached to a delivery vehicle known in the art as a Step Van. However, the field of the invention is not limited to such application. An attachment means of a preferred embodiment of the invention is configured to attach to a typical body panel of a delivery van. However, practice of the invention is still possible with minor variations to the attachment means to apply it to other type vehicles.

Figure 2:
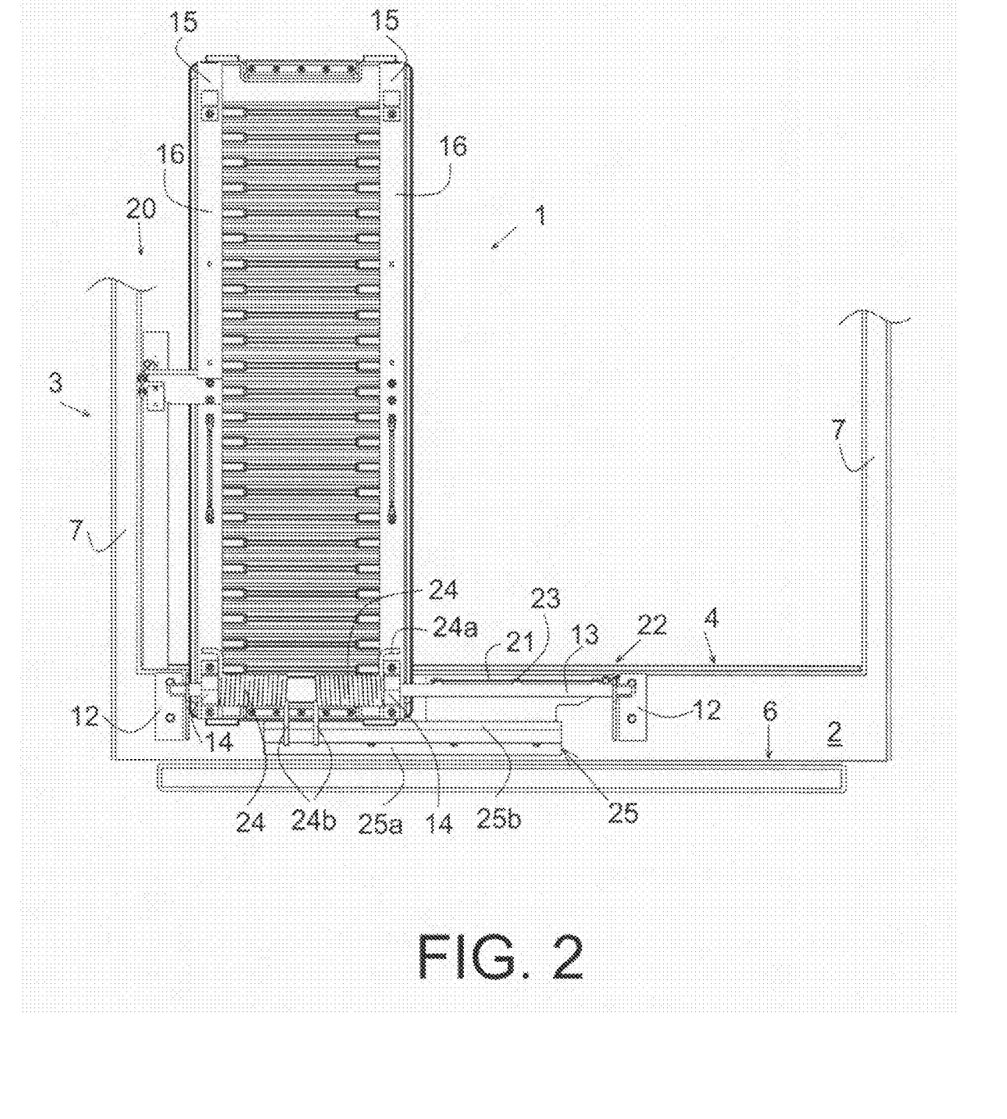
FIG. 2 is a rear view in relation to a delivery vehicle on which the ramp system is attached, showing the ramp system of the invention arranged to be in a stowed orientation.
Figure 3:
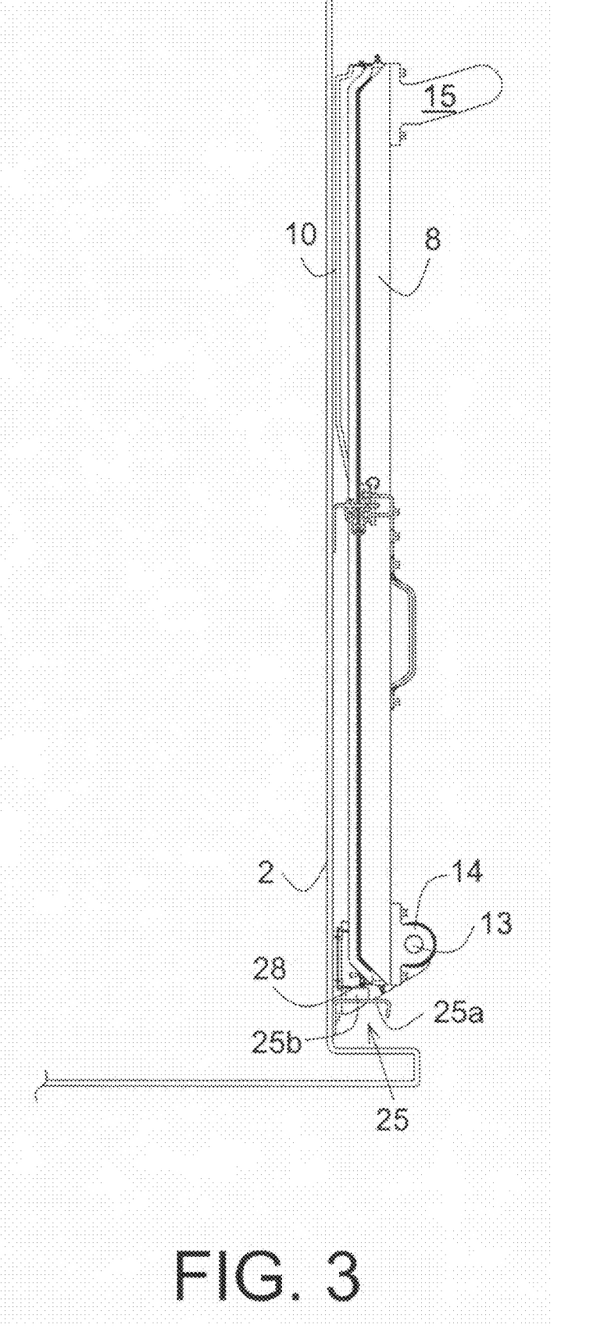
FIG. 3 is a side view, in relation to the delivery vehicle of FIG. 2, showing the ramp system of the invention arranged to be in a stowed orientation.

In FIG. 1, ramp system 1 is shown attached to a lower rear body panel 2 of a delivery vehicle 3. The ramp system 1 is shown in a use orientation in which it bridges a cargo bed 4 of the vehicle and ground surface 5 on which the vehicle is parked. The ground surface could be a parking lot, a street, a warehouse floor or any other surface generally flat and preferably level. The body of the delivery vehicle also includes a rear step 6 and vertical sides 7. FIGS. 2 and 3 show the ramp system 1 placed in its stowed orientation in which it is oriented substantially vertically.

Referring to FIGS. 1-3, the ramp portion of ramp system 1 is made up of 3 individual sections, a center section 8, a vehicle-end section 9 and a lower-end section 10. The center section 8, which is preferably the longest of the sections, is supported at one end by a support unit 11 which is attached to lower rear body panel 2 of the vehicle. Typically such body panel is not merely a light-gauge panel of the vehicle, but a heavier gauge material which makes up part of the framework of the vehicle body. The support unit 11 includes shaft support brackets 12 which support shaft 13. Also shown in FIG. 1 are shaft retainers 13a which project outwardly from the shaft support brackets 12 and then in a direction to oppose an end of the shaft. This arrangement is assembled when attaching the shaft support brackets to the vehicle. In FIG. 3, the shaft support bracket 12 is shown removed in order to show further details of support unit 11. The ramp center section 8 can rotate freely, in a range discussed in more detail below, about the central axis of shaft 13. Support of the ramp center section on shaft 13 is accomplished with bearings 14. In a preferred embodiment pillow block bearings are used.

The lower end of ramp center section 8 is supported by feet 15 which bear on ground surface 5 on which the delivery vehicle is parked. The feet 15 are preferably between 4 and 10 inches in length. Hinged to an upper end of center section 8 is vehicle-end section 9, which bridges between center section 8 and cargo bed 4; and hinged to a lower end of center section 8 is lower-end section 10, which bridges between center section 8 and ground surface 5. The two hinged connections of the ramp, combined with the rotatable support of the center section on the support unit 11, allow the ramp to adjust to any grade or the like found with the ground surface.

All sections of the ramp are preferably constructed of rails 16 with molded plastic panels 17 arranged between them. Faces of the panels upon which a delivery person would walk when using the ramp, are provided with a series of projections to provide improved traction. Also, a series of raised cleats 18 can be provided on the face of each panel to provide additional traction. In a preferred embodiment the cleats are aluminum angles having legs about ⅜" which are secured to the panels with one of the legs directed outward in relation to the face of the panel. Rear surfaces of the panel can have widthwise ribs to increase the strength of the panels in that direction.

Also, in order to provide for easier and safer use of the ramp, especially when a dolly or cart is utilized, the ramp sections can be provided with plastic guide rails 19 either attached to the rails 16 by fasteners or molded as one plastic piece. Although the preferred materials of the various components have been indicated, other materials are available in practice of the invention.

The width dimension of the ramp sections is preferably about 24 inches between the guide rails, however other dimensions can be used to accommodate special carts or the like which may be used in a particular industry. Preferred lengths for the sections of the ramp are: center section 40-80 inches; vehicle-end section 10-14 inches; and lower-end section 20-36 inches. The sections of the ramps should be such that vehicle-end section 9 and lower end section 10 can fold back against the face of center section 8 and at least partly nest inside rails 19 of center section 8. In FIG. 3 the nesting of lower-end section 10 in center section 8 can be seen. The nesting of vehicle end section 9 and the need for such nesting is discussed in more detail below.

As mentioned above, center section 8 of the ramp is supported on shaft 13 with use of bearings 14. In a preferred embodiment shaft 13 extends in a widthwise direction of the vehicle from an end of lower rear body panel 2 below left vertical side 7 to a location about ⅔ of the distance across the width of the vehicle. In use, the ramp can be located at any location along shaft 13 by sliding the center section from end to end of the shaft. In FIG. 1 the ramp is shown to be approximately centered in relation to a width of the vehicle.

As mentioned above, FIGS. 2 and 3 show the ramp sections in a stowed orientation, that is the vehicle-end section and the lower-end section are folded to have their faces substantially against the face of center section 8, and all of the sections are in a substantially vertical orientation, assuming the vehicle to which the ramp section is attached is on a substantially horizontal surface. When in the stowed orientation, a stowing bracket 20 consisting of a ramp mounted portion 20a and a vehicle mounted portion 20b are used to hold the ramp in the stowed orientation. Any means for linking the two portions such as a clevis pin or a padlock, for example, can be used. When in the stowed orientation, the ramp is near an end location on shaft 13. With this location, if loading and unloading is to be carried out without use of the ramp, at least ⅔ of the doorway to the cargo area is still easily accessible, as best seen in FIG. 2.

In order to eliminate the possibility of a delivery person being injured when loading and unloading with the ramp in the stowed condition, a gap guard 21, which covers an opening between shaft 13 and lower rear body panel 2, is provided. The gap guard 21 is preferably hinged from shaft support bracket 12, as best shown in FIG. 2 at 22. In FIG. 2 the gap guard is shown in a closed position and in FIG. 1 it is shown in an open position. On gap guard 21, small cushions 23 are provided to bear against shaft 13. Although gap guard 21 is shown in the closed portion in FIG. 2 with the ramp sections in the stowed orientation, the gap guard can also be in that position when the ramp is oriented for use and is located at the left end of shaft 13.

Figure 4:
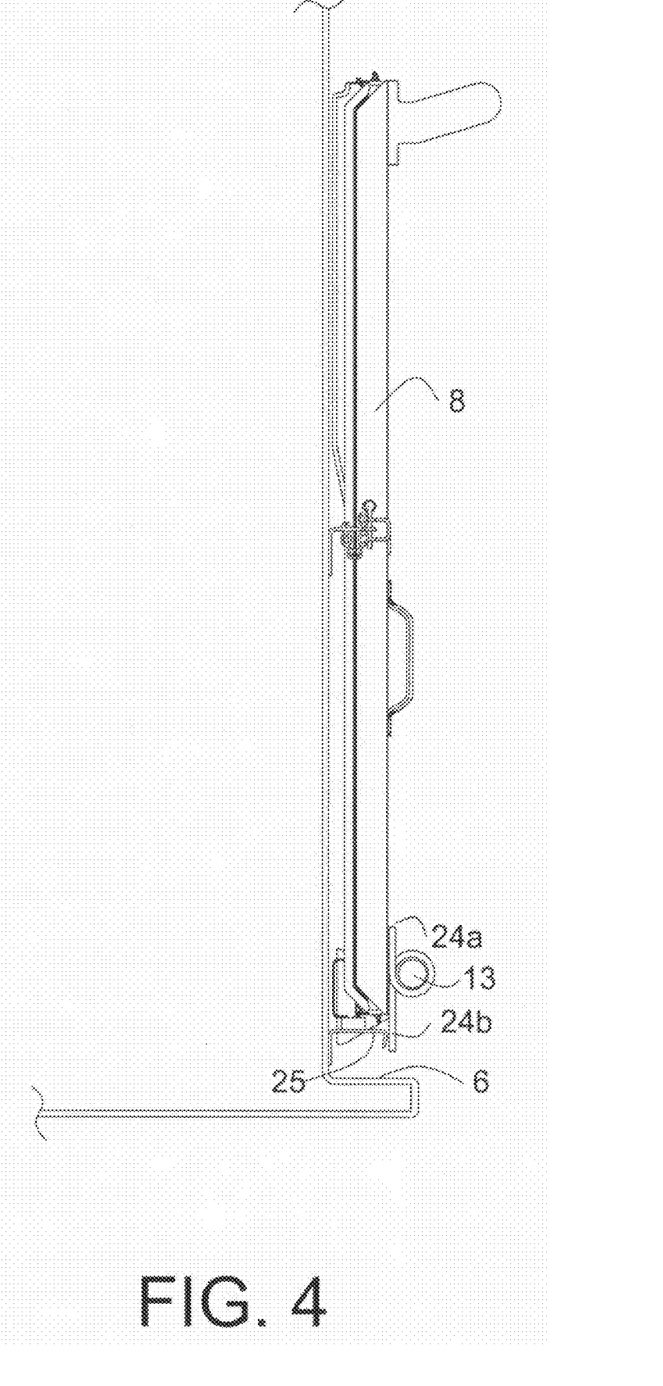
FIG. 4 is a side view, in relation to the delivery vehicle of FIG. 2, with components of the ramp system removed, for showing details of a torsion spring and ramp stop bracket of the ramp system of the invention.
Figure 6:
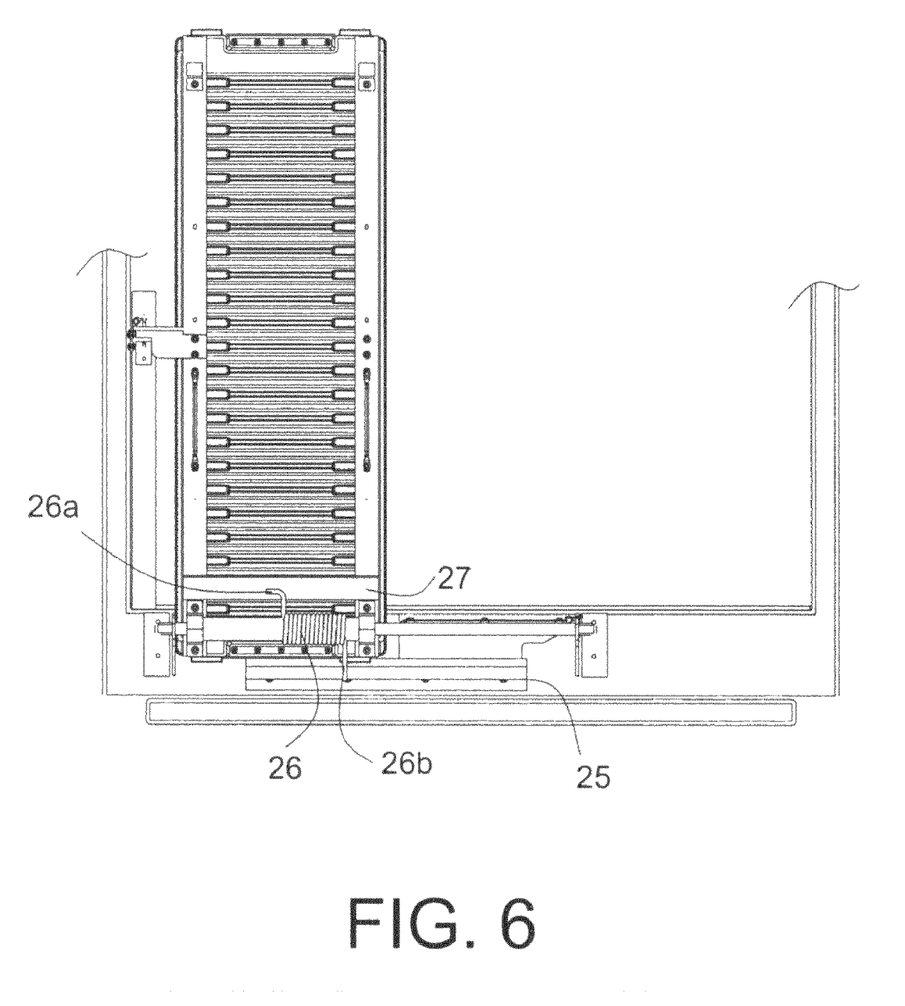
FIG. 6 is a rear view of the ramp system of the invention having a single torsion spring mechanism.

In order to enable a delivery person to carry out loading and unloading of the delivery vehicle in an efficient manner it is necessary that the ramp system be easily and quickly placeable in a stowed or useable orientation. To provide ease when changing from one orientation to the other, at least one, and preferably two torsion springs 24, are provided to counter balance at least part of the weight of the ramp sections. The torsion springs 24 are preferably disposed with coils thereof encircling shaft 13 with one leg 24a bearing on rails of center section 8, and the other leg 24b bearing on a ramp stop bracket 25, which is discussed below. In FIG. 6 a single torsion spring 26 is shown. The torsion springs are selected to have a torsional force to counter weight of the ramp sections, however the torsional force should not be of a strength that would result in the torsion springs raising the ramp sections without an additional use of force by a user. The arrangement of legs 24a and 24b of the springs should be such that when the ramp sections are in the stowed orientation the ends are not bearing on the center section 8 or the ramp stop bracket 25, as shown in FIG. 4, and the springs are in a state in which no tension is being applied. The use of two torsion springs is preferred so as to prevent any twisting of the ramp which could cause binding of bearings 14 on shaft 13. With the use of one torsion spring 26, as shown in FIG. 6, leg 26a should be centered in relation to the width of the ramp. Also, in order that leg 26a does not bear on a molded plastic panel of the ramp a metal cross member such as at 27 should be added to the ramp section. Leg 26b of the single torsion spring 26 bears on ramp stop bracket 25.

The torsion springs also perform another function. When the ramp is in the use, any movement of the ramp sections in relation to the widthwise direction of the vehicle is undesirable, as movement of the ramp when it is approached at an angle, for example, could cause a hazardous condition. In order to prevent movement of the center section 8, and thus all the sections of the ramp, the dimension of the internal diameter of the coils of each torsion spring is selected such that when the center section 8 is oriented vertically and the torsion spring is in a state in which no torsion is being applied, the spring is free to move along shaft 13; and, when the spring is applying tension, which occurs when center section 8 is in a use orientation, the coils of each spring lock on shaft 13 so as to prevent movement in an axial direction of the shaft when they are applying tension. FIG. 4 shows the state in which the spring is not applying tension and the spring is free to move along the length of the shaft.

Figure 5:
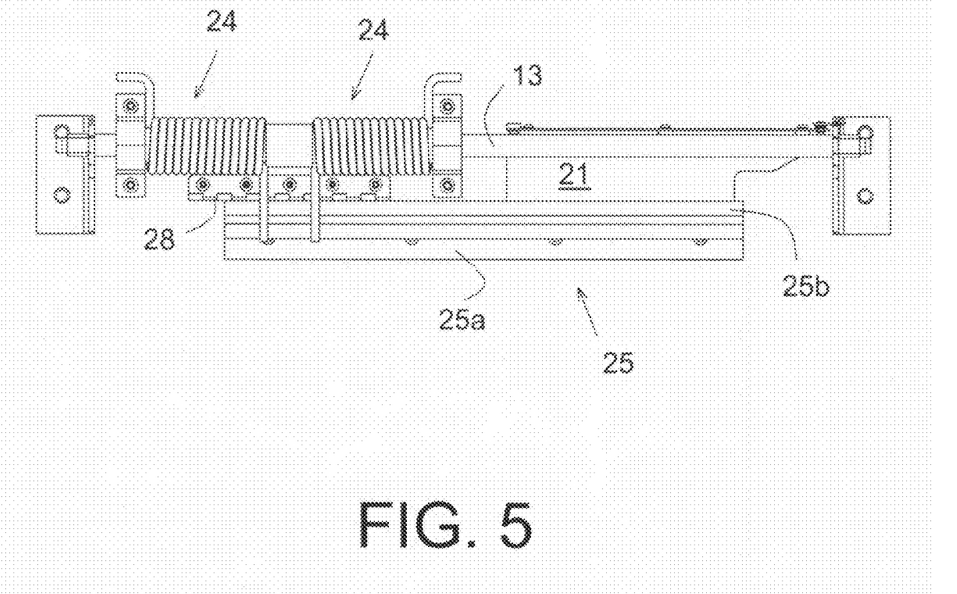
FIG. 5 is a view of the attachment means and ramp stop bracket of the ramp system of the invention from a side opposite a side for mounting to the vehicle.

When the ramp sections are being placed in the stowed orientation at the far left of shaft 13, the ramp sections are prevented from going beyond the vertical orientation, toward the cargo bed, by stowing bracket 20, as shown in FIG. 2. However, when the ramp sections are located toward a widthwise center of the delivery vehicle it is possible that the ramp sections might go beyond the vertical orientation toward the cargo bed. In order to prevent such undesired rotation of center section 8 about shaft 13, ramp stop bracket 25 is provided. Ramp stop bracket 25 preferably includes a ramp stop angle 25a and a ramp stop bumper 25b. Ramp stop angle 25a is attached to the lower rear body panel 2 as shown in FIG. 3 in order that one leg of the ramp stop angle 25a extends outward in a substantially horizontally oriented. Attached to a top of the one leg is the ramp stop bumper 25b. In operation, hinge 28 disposed between center section 8 and vehicle-end section 9 contacts the ramp stop bumper 25b and movement beyond the substantially vertical orientation is prevented. Such contacting arrangement is more clearly shown in FIG. 5 in which the ramp center section 8 and the ramp vehicle-end section 9 are not shown and solely hinge 28 which connects the two sections is shown contacting ramp stop bumper 25b. When it is desired to move the ramp sections along shaft 13, ramp center section 8 is rotated outward from the vehicle body a small amount in order that hinge 28 does not bear on ramp stop bumper 25b, however, it is not rotated to a degree at which the torsion springs lock on shaft 13, as discussed above.

In changing the ramp sections from a use orientation to a stowed orientation it is only necessary to fold a lower-end section 10 to be face-to-face against center section 8 and then raise the center section 8, with the assistance of torsion springs 24, to be slightly short of a vertical orientation and then slide the ramp sections to the left end of shaft 13. It is not necessary to fold vehicle-end section 9 against center section 8 as vehicle-end section 9 will be moved into a face-to-face and nesting arrangement with center section 8 when vehicle-end section 9 contacts the vehicle body and hinge 28 contacts ramp stop bumper 25b.

While specific materials, dimensional data, etc. have been set forth for purposes of describing embodiments of the invention, various modifications can be resorted to, in light of the above teachings, without departing from applicant's novel contributions.

What is claimed is:

1. A ramp system adapted to be attached to a vehicle to bridge a cargo bed of the vehicle and a surface at a different level than the cargo bed, comprising
   a ramp having:
     a center section,
     a vehicle-end section hinged to the center section to bridge the center section and the cargo bed, and
     a lower-end section hinged to the center section at a surface-supported end thereof to bridge the center section and the surface; and
   an attachment means adapted to be attached to the vehicle for supporting the center section and permitting rotation of the center section form a use orientation tog substantially vertical orientation for stowing; wherein
   said attachment means includes:
     at least one torsion spring acting to counter weight of the ramp during the rotation,
     a shaft for disposing in a widthwise direction of the vehicle on a rear portion of the body of the vehicle at a location lower than a cargo bed of the vehicle,
     said at least one torsion spring is disposed on the shaft so as to have coils thereof surrounding the shaft, and
     a rotation limiting means for preventing rotation of the ramp beyond the substantially vertical orientation in a direction toward the cargo bed,
     wherein said rotation limiting means comprises a ramp stop bumper for disposing on the vehicle body and arranged such that a hinge between sections of the ramp contacts the ramp stop bumper to prevent rotation of the ramp beyond the substantially vertical orientation toward the cargo bed.

2. The ramp system of claim 1, wherein the at least one torsion spring is configured to have one leg thereof bear on the ramp stop bracket and the of her leg thereof bear on the ramp center section in a manner that:
   the at least one torsion spring is not in tension when the ramp center section is in a substantially vertical orientation for stowing and the torsion spring is freely moveable along the shaft, and
   the at least one torsion spring is in tension when the ramp center section is oriented for use and the torsion spring is locked against the shaft so as to prevent movement in an axial direction of the shaft.

3. The ramp system of claim 1 including support brackets attached to the vehicle and shaft retainers provided on the support bracket: to retain the shaft.

4. The ramp system of claim 1 wherein said ramp sections are plastic panels and raised cleats are provided on a face of at least one of said ramp sections.

5. The ramp section of claim 4 where said cleats comprise aluminum angles having legs which are secured to the ramp sections with a leg directed outward in relation the face.

6. The ramp system of claim 1, further including a gap guard hingedly disposed from said attachment means to block access to a gap formed between the body of the vehicle and components of the attachment means.

7. A ramp system adapted to be attached to a vehicle to bridge a cargo bed of the vehicle and a surface at a different level than the cargo bed, comprising
   a ramp having:
   a center section,
   a vehicle-end section hinged to the center section to bridge the center section and the cargo bed, and
   a lower-end section hinged to the center section at a surface-supported end thereof to bridge the center section and the surface;
   an attachment means adapted to be attached to the vehicle having a shaft for supporting the center section and permitting varied placement of the ramp along a widthwise direction of the vehicle during use and permitting rotation of the center section from a use orientation to a substantially vertical orientation for stowing; and
   a rotation limiting means comprising a ramp stop bracket for disposing on the vehicle body and arranged such that a hinge between sections of the ramp contacts the ramp stop bracket for preventing rotation of the ramp beyond the substantially vertical orientation in a direction toward the cargo bed; wherein
   said attachment means further includes:
   two torsion springs having coils thereof surrounding the shaft and acting to counter weight of the ramp during the rotation and configured to have one leg of each torsion spring bear on the ramp stop bracket and the other leg of each torsion spring bear on the ramp center section in a manner that:
   the torsion spring is not in tension when the ramp center section is it a substantially vertical orientation for stowing and the torsion spring is freely moveable along the shaft, and
   the torsion spring is in tension when the ramp center section is oriented for use and the torsion spring is locked against the shaft so as to prevent movement in an axial direction of the shaft.

8. The ramp system of claim 7 further including a gap guard hingedly disposed from said attachment means to block access to a gap formed between the body of the vehicle and components of the attachment means.

9. The ramp system of claim 7 including support brackets attached to the vehicle and shalt retainers provided on the support brackets to retain the shaft.

10. The ramp system of claim 7 wherein said ramp sections are plastic panels and raised cleats are provided on a face of at least one of said ramp sections.

11. The ramp section of claim 10 where said cleats comprise aluminum angles having legs which are secured to the ramp sections with a leg directed outward in relation the face.

* * * * *